US011714887B2

(12) United States Patent
Agrawal et al.

(10) Patent No.: US 11,714,887 B2
(45) Date of Patent: Aug. 1, 2023

(54) APPLICATION FUNCTIONALITY AUTHENTICATION AND AUTHORIZATION IN A MULTI-CAMERA SYSTEM

(71) Applicant: Motorola Mobility LLC, Chicago, IL (US)

(72) Inventors: Amit Kumar Agrawal, Bangalore (IN); Soumya Ranjan Mund, Bangalore (IN); Himanshu Chug, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 307 days.

(21) Appl. No.: 16/941,029

(22) Filed: Jul. 28, 2020

(65) Prior Publication Data
US 2022/0035897 A1 Feb. 3, 2022

(51) Int. Cl.
*G06F 21/32* (2013.01)
*G06F 21/62* (2013.01)
*G06V 40/16* (2022.01)
*H04N 23/90* (2023.01)

(52) U.S. Cl.
CPC ............ *G06F 21/32* (2013.01); *G06F 21/629* (2013.01); *G06V 40/172* (2022.01); *H04N 23/90* (2023.01)

(58) Field of Classification Search
CPC ........ G06F 21/32; G06F 21/629; G06F 21/31; G06V 40/172; G06V 40/16; G06V 40/168; G06V 40/169; H04N 5/247; G06Q 20/08; G06Q 20/10; G06Q 20/102; G06Q 20/105; G06Q 20/108; G06Q 20/16; G06Q 20/326
See application file for complete search history.

(56) References Cited

U.S. PATENT DOCUMENTS

| | | | | |
|---|---|---|---|---|
| 9,319,221 | B1* | 4/2016 | Awad | H04L 9/3231 |
| 9,419,982 | B2* | 8/2016 | Matsuoka | G06F 21/32 |
| 2010/0005449 | A1* | 1/2010 | Karabulut | G06F 21/52 726/1 |
| 2013/0290234 | A1* | 10/2013 | Harris | G06Q 30/00 901/50 |
| 2014/0244494 | A1* | 8/2014 | Davis | G06Q 20/36 705/41 |

(Continued)

OTHER PUBLICATIONS

"Behavior changes: all apps", Retrieved from https://developer.android.com/preview/behavior-changes-all#security on Jul. 8, 2020, Jul. 8, 2020, 6 pages.

*Primary Examiner* — Richard A McCoy
(74) *Attorney, Agent, or Firm* — FIG. 1 Patents

(57) ABSTRACT

A device includes two cameras, a front facing camera and a back facing camera. In response to a request to use one camera (e.g., the back facing camera) with particular functionality of an application, the application queries a system to verify whether the user is authenticated and authorized to use the camera with the particular functionality of the application. This authentication and authorization is performed based on an image of the user captured using another camera of the device (e.g., the front facing camera). Depending on whether the user is authenticated and authorized to use the camera with the particular functionality of the application, the particular functionality is performed using the camera, secondary (e.g., lesser) functionality is performed using the camera, or no functionality is performed using the camera.

20 Claims, 6 Drawing Sheets

(56) References Cited

U.S. PATENT DOCUMENTS

| | | | |
|---|---|---|---|
| 2015/0009303 A1* | 1/2015 | Zuidema | G06F 1/1637 |
| | | | 348/51 |
| 2015/0161434 A1* | 6/2015 | Ross | G06F 21/32 |
| | | | 382/118 |
| 2018/0144110 A1* | 5/2018 | Creamer | G06F 21/316 |
| 2018/0321826 A1* | 11/2018 | Bereza | G06T 19/20 |
| 2019/0213311 A1* | 7/2019 | Tussy | H04W 12/06 |
| 2019/0311350 A1* | 10/2019 | Liu | G06Q 20/401 |
| 2021/0124839 A1* | 4/2021 | Agrawal | G06F 21/6245 |
| 2022/0215396 A1* | 7/2022 | Ueki | G06V 20/52 |

* cited by examiner

APPLICATION FUNCTIONALITY AUTHENTICATION AND AUTHORIZATION IN A MULTI-CAMERA SYSTEM

BACKGROUND

As technology has advanced computing devices have become increasingly commonplace in our daily lives. Many people store large amounts of information on their devices, some of which is personal, and use their devices to access a wide range of service accounts. To prevent other people from grabbing a user's device and accessing their personal information or service accounts, access to the device can be restricted to those that know a passcode or personal identification number (PIN) to unlock the device. However, oftentimes users share their devices with others, such as family members. For example, a father may let his son use the father's device to watch videos. Once the device is unlocked for the son (e.g., the son may know the passcode or PIN to unlock the device), the son frequently has access to the personal information or service accounts of the father. This reduces or eliminates the security of the user's personal information or service accounts, which can lead to user frustration with their device.

BRIEF DESCRIPTION OF THE DRAWINGS

Embodiments of application functionality authentication and authorization in a multi-camera system are described with reference to the following drawings. The same numbers are used throughout the drawings to reference like features and components.

DETAILED DESCRIPTION

Figure 1:
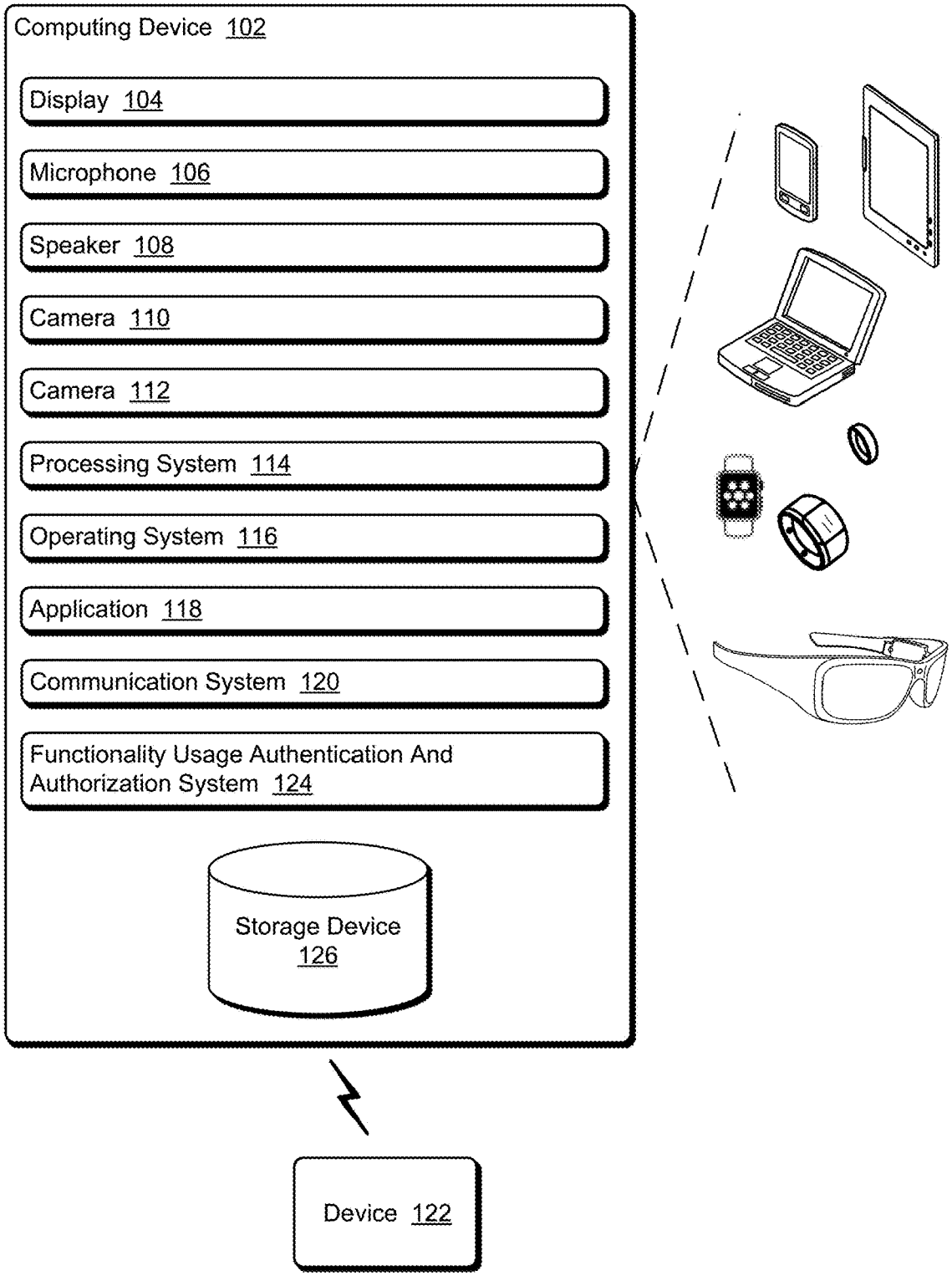
FIG. 1 illustrates an example system including a computing device implementing the techniques discussed herein.

Application functionality authentication and authorization in a multi-camera system is discussed herein. Generally, a device includes two cameras, a front facing camera and a back facing camera. In response to a request to use one camera (e.g., the back facing camera) with particular functionality of an application on the device, the application queries a system to verify whether the user is authenticated to use the application and authorized to use the camera with the particular functionality of the application. This authentication and authorization is performed, in part, based on an image of the user captured using another camera of the device (e.g., the front facing camera). If the user is authenticated to use the application and authorized to use the camera with the particular functionality of the application, the particular functionality is performed using the camera. If the user is authenticated to use the application and not authorized to use the camera with the particular functionality of the application, but is authorized to use the camera with secondary (e.g., lesser) functionality of the application, then the secondary functionality is performed using the camera. If the user is not authenticated to use the application or is not authorized to use the camera with the particular or a secondary functionality of the application, then the application is prevented from using the camera to perform the particular or secondary functionality of the application.

For example, the application may be an application used to access a social media account. A father and his teenage daughter may both know the password to unlock the device and thus both the father and the teenage daughter can be authenticated to use the application. However, the father can set different authorization levels for himself and his teenage daughter so that the father has access to all functionality of the application, but his teenage daughter has access to only a subset of the functionality of the application. E.g., the teenage daughter may be authorized to use the application but not authorized to post captured images on the social media account, whereas the father is authorized to post captured images on the social media account. Accordingly, in response to a request to use the application to post a captured image, the system prevents the teenage daughter from posting a captured image on the social media account but allows the teenage daughter to perform secondary functionality with the social media account (e.g., view images posted by the father or other users).

The techniques discussed herein improve the operation of a computing device by improving the security of the device. Situations can arise in which multiple users (e.g., family members) have access to the computing device and have the password or are otherwise authenticated to unlock the device or access particular applications. Different users can be associated with different authorization levels, allowing a primary user or owner of the device to restrict the functionality that a first camera of the device can be used with for different users. The authentication and authorization is performed using an image captured by a second camera of the device at approximately the same time that a request to use the first camera to perform the functionality is received. Accordingly, the techniques discussed herein prevent a user from unlocking the device and having another user take and use the device to perform the functionality.

Furthermore, resources in the device, such as power, can be conserved by performing the authentication and authorization of the user only in certain situations, such as only for applications that are on an allowed list. If the additional authentication and authorization provided by the techniques discussed herein is not desired or needed for a particular application, then the power and other resource usage involved in capturing an image of the user and performing the authentication and authorization need not be expended.

FIG. 1 illustrates an example system 100 implementing the techniques discussed herein. The system 100 includes a computing device 102 that can be, or include, many different types of computing or electronic devices. For example, the computing device 102 can be a smartphone or other wireless phone, a camera (e.g., compact or single-lens reflex), or a tablet or phablet computer. By way of further example, the computing device 102 can be a notebook computer, a laptop computer, a wearable device (e.g., a smartwatch, an augmented reality headset or device, a virtual reality headset or device), a personal media player, a personal navigating device (e.g., a global positioning system), an entertainment device (e.g., a gaming console, a portable gaming device, a streaming media player, a digital video recorder, a music or other audio playback device), a video camera, an Internet of Things (IoT) device, a fitness tracker, a smart TV, an automotive computer, and so forth.

The computing device 102 includes a display 104, a microphone 106, a speaker 108, a camera 110, and a camera 112. The display 104 can be configured as any suitable type of display, such as an organic light-emitting diode (OLED) display, active matrix OLED display, liquid crystal display (LCD), in-plane shifting LCD, projector, and so forth. The microphone 106 can be configured as any suitable type of microphone incorporating a transducer that converts sound into an electrical signal, such as a dynamic microphone, a condenser microphone, a piezoelectric microphone, and so forth. The speaker 108 can be configured as any suitable type of speaker incorporating a transducer that converts an electrical signal into sound, such as a dynamic loudspeaker using a diaphragm, a piezoelectric speaker, non-diaphragm based speakers, and so forth.

The cameras 110 and 112 can each be configured as any suitable type of image capture component that captures images digitally using any of a variety of different technologies (e.g., any type of imager), such as a charge-coupled device (CCD) sensor, a complementary metal-oxide-semiconductor (CMOS) sensor, combinations thereof, and so forth. The cameras 110 and 112 can each include a single sensor and lens, or alternatively multiple sensors and multiple lenses. Each of the camera 110 and 112 can capture still images as well as video. The cameras 110 and 112 may be the same types of cameras including the same types of sensors and lenses, or may be different types of cameras.

The cameras 110 and 112 can be positioned on different surfaces of the computing device 102. For example, the camera 110 may be a back facing camera positioned to capture images from the back of the computing device 102 (e.g., the opposite surface as the display 104 is positioned on) and the camera 112 may be a front facing camera positioned to capture images from the front of the computing device 102 (e.g., the same surface as the display 104 is positioned on).

In one or more embodiments at least one of the cameras 110 and 112 (e.g., a front facing camera) includes a depth sensor. Use of a depth sensor facilitates facial recognition of users, such as by facilitating distinguishing physical human faces from pictures of human faces.

Although illustrated as part of the computing device 102, it should be noted that one or more of the display 104, the microphone 106, the speaker 108, the camera 110, and the camera 112 can be implemented separately from the computing device 102. In such situations, the computing device 102 can communicate with the display 104, the microphone 106, the speaker 108, or the cameras 110 and 112 via any of a variety of wired (e.g., Universal Serial Bus (USB), IEEE 1394, High-Definition Multimedia Interface (HDMI)) or wireless (e.g., Wi-Fi, Bluetooth, infrared (IR)) connections. For example, the display 104 may be separate from the computing device 102 and the computing device 102 (e.g., a streaming media player) communicates with the display 104 via an HDMI cable. By way of another example, the microphone 106 may be separate from the computing device 102 (e.g., the computing device 102 may be a television and the microphone 106 may be implemented in a remote control device) and voice inputs received by the microphone 106 are communicated to the computing device 102 via an IR or radio frequency wireless connection.

The computing device 102 also includes a processing system 114 that includes one or more processors, each of which can include one or more cores. The processing system 114 is coupled with, and may implement functionalities of, any other components or modules of the computing device 102 that are described herein. In one or more embodiments, the processing system 114 includes a single processor having a single core. Alternatively, the processing system 114 includes a single processor having multiple cores or multiple processors (each having one or more cores).

The computing device 102 also includes an operating system 116. The operating system 116 manages hardware, software, and firmware resources in the computing device 102. The operating system 116 manages one or more applications 118 running on the computing device 102, and operates as an interface between applications 118 and hardware components of the computing device 102.

The computing device 102 also includes a communication system 120. The communication system 120 manages communication with various other devices, such as the device 122. The device 122 can be any of a variety of different types of devices, analogous to the discussion above regarding computing device 102. The communication with the device 122 includes establishing voice calls, sending electronic communications to and receiving electronic communications from the device 122, and so forth. The content of these electronic communications and the recipients of these electronic communications is managed by an application 118 or the operating system 116. This communication can take various forms, such as voice calls (e.g., over a cellular system, public switched telephone network (PSTN), network (e.g., using voice over Internet Protocol (VoIP), etc.), short messaging service (SMS) messages, multimedia messaging service (MMS) messages, email, group based chat messaging system, and so forth. This communication can be carried out over a network, which can be any of a variety of different networks, including the Internet, a local area network (LAN), a public telephone network, a cellular network (e.g., a third generation (3G) network, a fourth generation (4G) network, a fifth generation (5G) network), an intranet, other public or proprietary networks, combinations thereof, and so forth. The computing device 102 can thus communicate with other devices wirelessly and accordingly is also referred to as a wireless device.

The computing device 102 also includes a functionality usage authentication and authorization system 124. The functionality usage authentication and authorization system 124 authenticates users and determines authorizations of users to use a camera with particular functionality of the computing device 102. This particular functionality involves using one of the cameras 110 and 112, typically the camera positioned to capture images from the back of the computing device 102, to capture images. The functionality usage authentication and authorization system 124 may authenticate users and authorize users to access particular functionality of the computing device 102 for one or more applications 118. The particular applications for which the functionality usage authentication and authorization system 124 authenticates and authorizes users can optionally be specified in an allowed list of applications for performing the particular functionality. This alleviates the need to expend resources capturing an image of the user and performing the authentication and authorization in situations in which an application is not approved to perform the particular functionality.

The functionality usage authentication and authorization system 124 can be implemented in a variety of different manners. For example, the functionality usage authentication and authorization system 124 can be implemented as multiple instructions stored on computer-readable storage media and that can be executed by the processing system 114. Additionally or alternatively, the functionality usage authentication and authorization system 124 can be implemented at least in part in hardware (e.g., as an application-specific integrated circuit (ASIC), a field-programmable gate array (FPGA), an application-specific standard product (ASSP), a system-on-a-chip (SoC), a complex programmable logic device (CPLD), and so forth).

Although illustrated as separate from the operating system 116 and the application 118, additionally or alternatively the functionality usage authentication and authorization system 124 can be implemented as part of the operating system 116 or an application 118. For example, a particular one or more applications 118 may implement a functionality usage authentication and authorization system 124. By way of another example, the operating system 116 may implement, and make available to one or more applications 118, the functionality usage authentication and authorization system 124.

The computing device 102 also includes a storage device 126. The storage device 126 can be implemented using any of a variety of storage technologies, such as magnetic disk, optical disc, Flash or other solid state memory, and so forth. The storage device 126 can store various program instructions and data for any one or more of the operating system 116, application 118, and the functionality usage authentication and authorization system 124.

Figure 2:
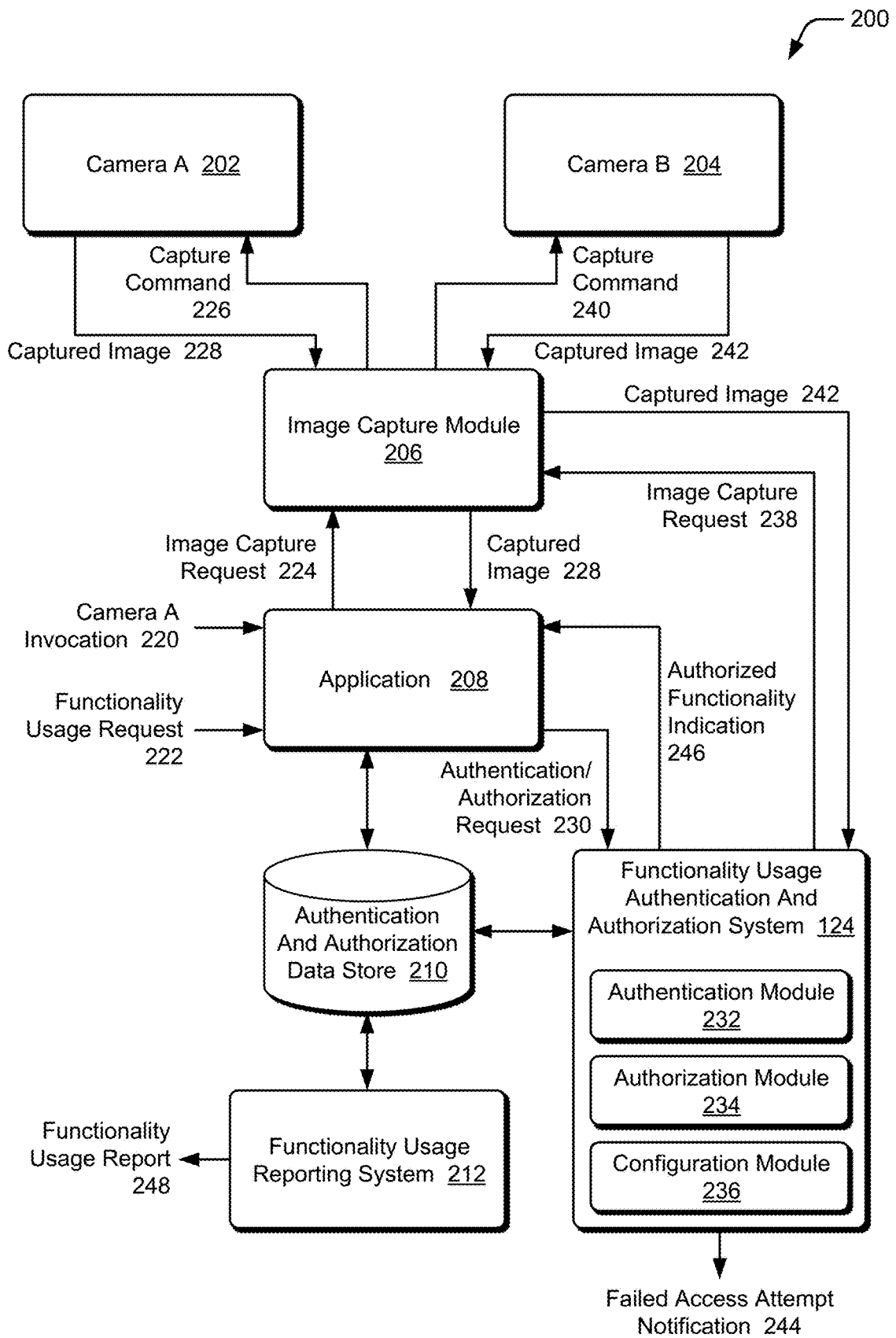
FIG. 2 illustrates an example system implementing the techniques discussed herein.

FIG. 2 illustrates an example system 200 implementing the techniques discussed herein. The system 200 includes the functionality usage authentication and authorization system 124 of FIG. 1, two cameras (camera A 202 and camera B 204), an image capture module 206, an application 208, an authentication and authorization data store 210, and a functionality usage reporting system 212. Although illustrated as separate from the application 208, the functionality usage authentication and authorization system 124 or the functionality usage reporting system 212 can be included as part of the app 208.

The application 208 receives a camera invocation 220 from a user to access camera A 202. This camera invocation 220 can take various forms, such as a request to activate (e.g., power up or power on) camera A 202, a request to activate (e.g., launch, execute, resume execution of) the application 208 that uses camera A 202, a request to capture an image using camera A 202, and so forth. The application 208 can be an application 118 of FIG. 1 or a program of the operating system 116 of FIG. 1. Camera A 202 and camera B 204 can be camera 110 and camera 112 of FIG. 1, respectively. Accordingly, in one or more embodiments camera A 202 is a back facing camera and camera B 204 is a front facing camera. Camera A 202 and camera B 204 can be used concurrently, allowing for concurrent capturing of images from the front and back of the computing device 102.

Figure 3:
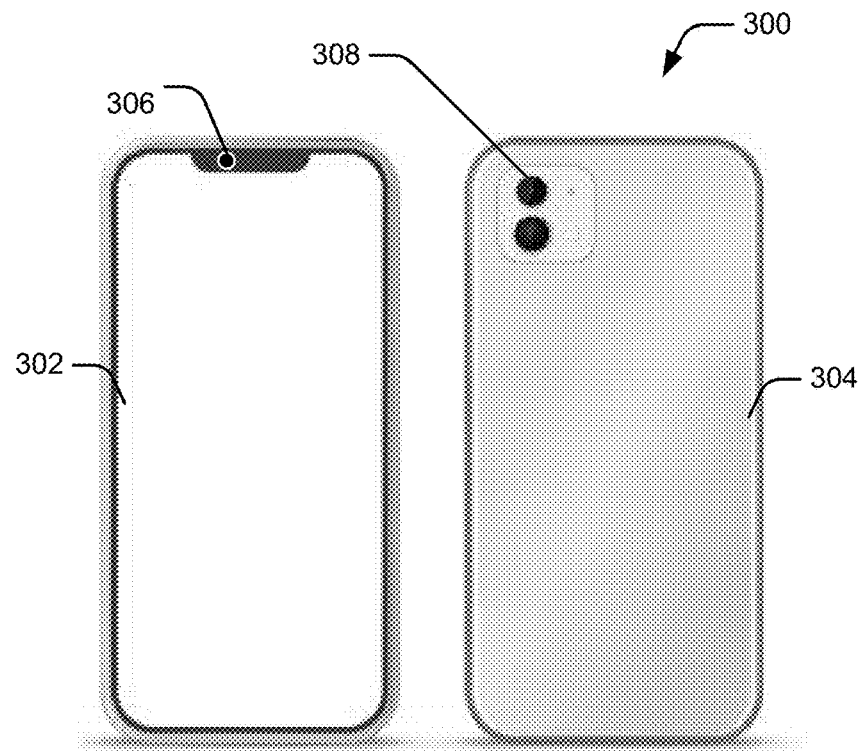
FIG. 3 illustrates an example of a wireless device.

FIG. 3 illustrates an example 300 of a wireless device (e.g., a smartphone). The wireless device has a front side 302 and a back side 304. The front side has a front facing camera 306, which can be camera B 204 of FIG. 2. The back side has a back facing camera 308, which can be camera A 202 of FIG. 2.

Returning to FIG. 2, the application 208 also receives a functionality usage request 222, which is a request for the computing device 102 to use camera A 202 with particular functionality of the application 208. In one or more embodiments, prior to receiving the functionality usage request 222 the user requests to launch or run the application. The application 208 optionally performs a user authentication in response to the request to launch or run the application, such as verification of a fingerprint, PIN, password, face (e.g., captured by camera B 204), and so forth. This user authentication guards against a user unlocking the computing device 102 and having someone else take the phone and launch application 208.

The functionality usage request 222 is typically a request to take one or more actions with one or more images captured by camera A 202, such as transfer money based on a payment code in a captured image, communicate the captured image to another device or service, and so forth. Additionally or alternatively, the camera invocation 220 can be inherent in the functionality usage request 222, so a separate camera invocation 220 need not be received. The functionality usage request 222 can be received in various manners, such as user selection of a menu item or user interface button, user input of an audio command, identification of a command embedded in a code (e.g., a quick response (QR) code) in the image captured by camera A 202, a request to use a camera of the computing device 102, and so forth. The functionality usage request 222 can also be inherent in the running of the application 208. For example, the functionality usage request 222 can be a request to run an application that is on an allowed list to perform certain types of functionality (e.g., financial transactions), a user request to use camera A 202 by an application that is on an allowed list to perform certain types of functionality (e.g., financial transactions), and so forth.

In one or more embodiments, in response to the camera invocation 220 or the functionality usage request 222, the application 208 communicates an image capture request 224 to the image capture module 206 that indicates to capture an image with camera A 202. The image capture module 206 communicates a capture command 226 for camera A 202 to capture an image 228, which is returned to the image capture module 206 and then the application 208 as captured image 228. It is expected that the back of the phone is facing away from the user and thus that the captured image 228 will include objects or people other than the user (e.g., a payment code displayed by another device, such as device 122 of FIG. 1).

The application 208 communicates an authentication/authorization request 230 to the functionality usage authentication and authorization system 124. The authentication/authorization request 230 optionally includes the captured image 228. In one or more embodiments, the image capture module 206 issues the capture command 226 and receives the captured image 228 prior to sending the authentication/authorization request 230 because the functionality usage authentication and authorization system 124 uses the captured image 228 to authorize the user. In such situations, the authentication/authorization request 230 includes the captured image 228. Additionally or alternatively, the image capture module 206 issues the capture command 226 and receives the captured image 228 in response to the functionality usage authentication and authorization system 124 indicating that the user is authenticated and authorized to use camera A 202 with the requested functionality. In such situations, the authentication/authorization request 230 does not include the captured image 228.

The functionality usage authentication and authorization system 124 includes an authentication module 232, an authorization module 234, and a configuration module 236. The authentication module 232 authenticates the user to determine whether the user is approved to use the application 208. In response to the authentication/authorization request 230, the authentication module 232 communicates an image capture request 238 to the image capture module 206 that indicates to capture an image with camera B 204. The image capture module 206 communicates a capture command 240 for camera B 204 to capture an image, which is returned to the image capture module 206 and then the application 208 as captured image 242. Since the user has input a request to use functionality of the application 208, it is expected that the front of the phone is facing the user and thus that the captured image 242 will include the user. The image 242 is captured at approximately the same time as the image 228 is captured (e.g., within a second or two of each other). Accordingly, the application 208 can have a high degree of confidence that the user of the computing device 102 that provided the functionality usage request 222 or camera invocation 220 is the user in the captured image 242.

The authentication and authorization data store 210 maintains authentication information including images or other data of users that are approved to use the application 208. The authentication module 232 can use any of a variety of public or proprietary techniques to compare the captured image 242 of the user to the stored authentication information and determine whether the user is approved to use the application 208. This can be on an application basis (e.g., different users can be approved to use different applications) or on a device basis (e.g., the user is authenticated to use multiple applications, such as all user applications, on the computing device 102).

The authorization module 234 determines whether the user is authorized for access to the functionality. In one or more embodiments this authorization is only performed if the user is authenticated to use the application 208 by the authentication module 232. Although the user may be authenticated to use the application 208, he may not be authorized to use camera A 202 or camera B 204 with all of the functionalities supported by the application 208. For example, a user may be authenticated to use a social media application to access a social media account and browse posts made on that social media account, but may not be authorized to post captured images (e.g., captured by camera A 202 or camera B 204) on that social media account. By way of another example, a user may be authenticated to use a financial application that uses camera A 202 to capture payment codes to transfer money but may be authorized to transfer only a certain amount of money (e.g., less than $500). Thus, in some situations the user is not authorized to use the requested functionality, but is authorized to use secondary functionality (e.g., lesser functionality) of the application 208.

The authentication and authorization data store 210 maintains authorization information indicating which functionality of application 208 the user is authorized to use. This authorization information can take various forms, such as limits on what actions the user can take with images captured by camera A 202 or camera B 204 (e.g., the user may be able to view the images but not upload the images to a social media account or communicate the images to another user), limits on what actions the user can take based on the content of images captured by camera A 202 (e.g., if the image includes a payment code to transfer money from one bank account to another, the user may be limited to transferring amounts less than $500), and so forth. Thus, once authenticated, which functionality of application 208 the user is authorized to use can be readily determined.

In one or more embodiments, in situations in which the user is not authenticated or is not authorized to use camera A 202 or camera B 204 with the requested functionality (or with a lesser functionality), the functionality usage authentication and authorization system 124 outputs a failed access attempt notification 244. This failed access attempt notification 244 can be output in various manners, such as communicated to another user, device, or system by email, message, or other communication mechanism, an audible or visual alert, stored in the authentication and authorization data store 210, and so forth. The failed access attempt notification 244 can include various information, such as an indication of the application 208, an indication of the requested functionality, the captured image 242, and so forth.

The configuration module 236 allows a user of the computing device 102 (e.g., the owner or primary user of the computing device 102) to configure the authentication or authorization information for different user. For example, the user can provide inputs to the configuration module 236 to indicate which users are approved to use the application 208, which functionality of the application 208 each user is authorized to use, and so forth. The configuration module 236 optionally requires additional authentication to allow such configuration of the authentication or authorization information (e.g., a fingerprint of the owner or primary user, a facial scan of the owner or primary user, a password known only to the owner or primary user, and so forth).

The functionality usage authentication and authorization system 124 returns an authorized functionality indication 246 to the application 208 indicating whether the user is authenticated and if so, what actions the user is authorized to take. If the user is authorized to only perform a lesser functionality then an indication of that lesser functionality is included in the authorized functionality indication 246. In one or more embodiments, the authorized functionality indication 246 indicates that 1) the user is authenticated and authorized to use camera A 202 or camera B 204 with the requested functionality, 2) the user is authenticated but authorized to use camera A 202 or camera B 204 with only a lesser functionality than requested, or 3) the user is not authenticated or is not authorized to use camera A 202 or camera B 204 with the requested functionality (or with a lesser functionality).

In response to the authorized functionality indication 246 indicating that the user is authenticated and authorized to use camera A 202 or camera B 204 with the requested functionality, the application 208 allows the user to perform the requested functionality. Performing the requested functionality may involve capturing additional images by camera A 202 or camera B 204.

In response to the authorized functionality indication 246 indicating that the user is authenticated but authorized to use camera A 202 or camera B 204 with only a lesser functionality than requested, the application 208 allows the user to perform the lesser functionality. Performing the lesser functionality may involve capturing additional images by camera A 202 or camera B 204. The application 208 can automatically perform the lesser functionality or can prompt the user to indicate whether he desires to perform the lesser functionality. For example, if the requested functionality was to transfer $1000 to another account but the user is only authorized to transfer $500 or less, then the application 208 can prompt the user to indicate whether he wants to perform the lesser functionality of transferring $500 (or some other user indicated amount that is less than $500).

In response to the authorized functionality indication 246 indicating that the user is not authenticated or is not authorized to use camera A 202 or camera B 204 with the requested functionality (or with a lesser functionality), the application 208 does not perform the requested functionality or any lesser functionality.

Regardless of whether the requested functionality is performed, the application 208 maintains a record of the functionality usage request in, for example, authentication and authorization data store 210. This record can include various information, such as an indication of the application 208, an indication of the requested functionality, what functionality was performed (e.g., what lesser functionality was performed), the captured image 242, and so forth. Accordingly, for each functionality usage request 222, the authentication and authorization data store 210 has a record with the image of the user. This allows for easier understanding of which users are performing which functionality as well as indicates which users are attempting to perform functionality that they are not authorized to perform.

In one or more embodiments, the functionality usage reporting system 212 provides information regarding the functionality usage of the computing device 102 as functionality usage report 248. The functionality usage report 248 includes the information in the various records stored in the authentication and authorization data store 210. For example, for each of one or more users, the functionality usage report 248 includes, for each functionality usage request, an indication of the application 208, an indication of the requested functionality, what requested functionality was performed, the captured image 236, and so forth.

Figure 4:
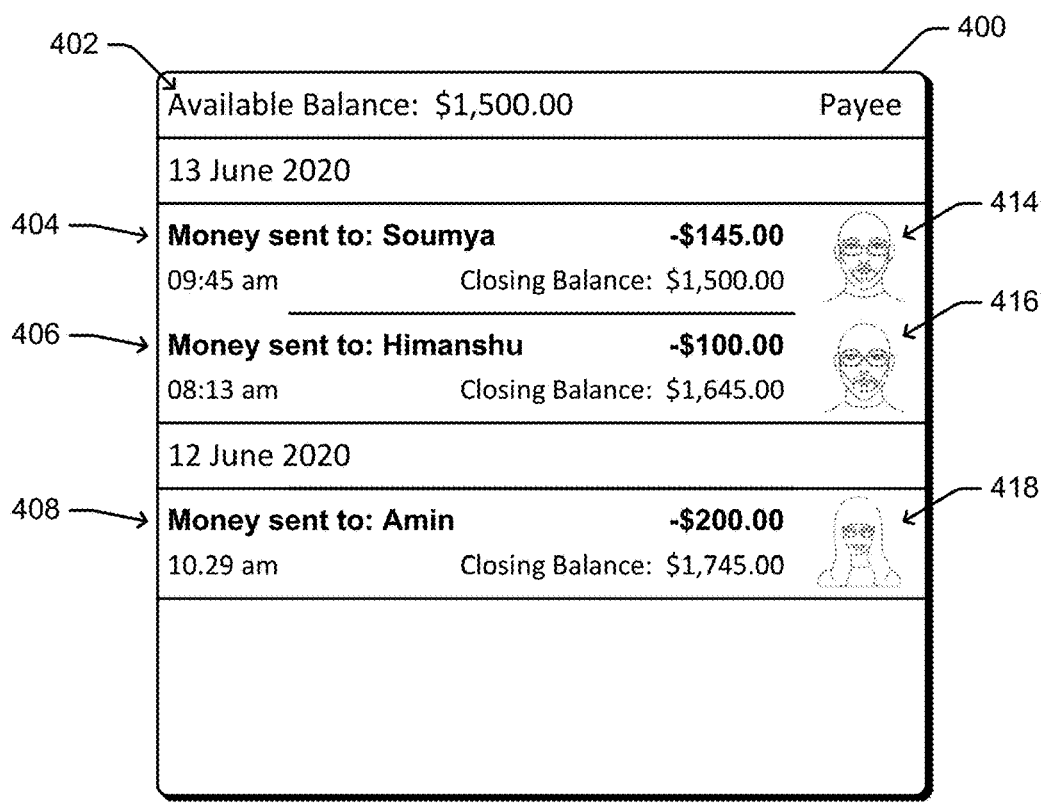
FIG. 4 illustrates an example of a functionality usage report.

FIG. 4 illustrates an example of a functionality usage report 400. In the illustrated example of FIG. 4, the application 208 is a financial application used to make mobile payments (e.g., transfer money from one account to another using the computing device 102). The functionality usage 400 describes the various functionality usage (e.g., user initiated transactions to transfer money to other users) that were performed using the application 208. As illustrated, a current account balance 402 is displayed along with each transaction that was performed. Furthermore, a user initiated transaction 404 to transfer money to Soumya, a user initiated transaction 406 to transfer money to Himanshu, and a user initiated transaction 408 to transfer money to Amin were initiated. Furthermore, for each user initiated transaction 404, 406, and 408, an image 414, 416, and 418, respectively is displayed. These images 414, 416, and 418 are the images that were used to perform the authentication and authorization of the user initiating the transfer (e.g., captured by camera B 204). Accordingly, the functionality usage report 246 provides a visual indication of the user of the phone when the functionality (each of user initiated transactions 404, 406, and 408) was performed.

In one or more embodiments, the images 414, 416, and 418 are also hyperlinks or other connections allowing additional information regarding the users in the images to be obtained. For example, the functionality usage reporting system 212 can determine a contact (e.g., in a contact list or address book of the computing device 102 that includes images of contacts) that corresponds to each image 414, 416, and 418 using any of a variety of public or proprietary image comparison techniques. The functionality usage reporting system 212 can maintain a connection between each image 414, 416, and 418 and the corresponding contact, allowing the user to select an image 414, 416, or 418 and have the corresponding contact information for the person in the selected image displayed. Additionally or alternatively, the functionality usage report 400 can include the image of the user (from the contact list or address book).

Returning to FIG. 2, it should be noted that some discussions of system 200 refer to whether the user is authorized to use camera A 202 with the requested functionality. Additionally or alternatively, the functionality usage authentication and authorization system 124 can determine whether the user is authorized to use camera B 204 with the requested functionality.

In one or more embodiments, the authentication module 232 accesses an allowed list of applications to determine whether to authenticate a user of the computing device 102. The allowed list of applications can be received or generated from various sources, such as authentication and authorization data store 210, another module of the computing device 102, another device or service, generated based on metadata associated with the application 208 (e.g., an application store or the application itself may indicate a type of the application, and only particular types of applications (e.g., mobile payment applications) are on the allowed list), and so forth. If the application 208 is on the allowed list then the functionality usage authentication and authorization system 124 proceeds to authenticate and authorize the user as discussed above.

However, in some situations the functionality usage authentication and authorization system 124 may receive an authentication/authorization request 230 from an application 208 that is not on the allowed list. If the authentication module 232 determines that the application 208 is not on the allowed list, then the authorized functionality indication 246 can indicate that authentication and authorization will not be performed, or the authentication/authorization request 230 can simply be ignored by the functionality usage authentication and authorization system 124. Regardless, if the application 208 is not on the allowed list then the image capture request 238 is not sent to the image capture module 206 and the captured image 242 is not returned to the functionality usage authentication and authorization system 124. Resources in the computing device 102, such as power, can thus be conserved because resources are not expended to capture the image 242 if the application 208 is not on the allowed list. Similarly, if another application 118 does not provide an authentication/authorization request 230 to the functionality usage authentication and authorization system 124, resources in the computing device 102 can be conserved because resources (e.g., power) are not expended to capture the image 242 if the application is not requesting the authentication and authorization from the functionality usage authentication and authorization system 124.

The system 200 supports a variety of different usage scenarios. For example, assume that the application 208 is an application used to access a social media account. A father and his son may both know the PIN to unlock the computing device 102 and launch the application 208 and thus both the father and the son can be authenticated to use the application 208. However, the father can set different authorization levels for himself and his son so that the father has access to all functionality of the application 208 but his son has access to only a subset of the functionality of the application 208. E.g., the son may not be authorized to post captured images (e.g., captured by camera A 202) on the social media account but the father is authorized to post captured images (e.g., captured by camera A 202) on the social media account. Accordingly, the functionality usage authentication and authorization system 124 prevents the son from posting captured images on the social media account but allows the son to perform other functionality with the social media account (e.g., view images posted by the father or other users).

In one or more embodiments, the application 208 is a financial application used to make mobile payments (e.g., transfer money from one account to another using the computing device 102). E.g., the application 208 may be a mobile payment application that interacts with a cloud-based payment service that enables the user of the computing device 102 to quickly exchange funds or perform financial transactions with other users or merchants without the use of a dedicated point of sale terminal. In such situations, the camera invocation 220 can be a request to activate (e.g., power up or power on) camera A 202. Camera A 202 can capture an image of a payment code (e.g., a QR code or unified payment interface (UPI) code) indicating an amount of money to transfer and an account to transfer the money to. The application 208 identifies the payment code and interprets the captured image of the payment code as the functionality usage request 222. Thus, the application 208 detects initiation of a financial transaction by scanning or analyzing the payment code.

In response to a user request to make a mobile payment, the application 208 prompts the user to authenticate himself or herself. This provides an additional verification, after the computing device 102 is unlocked, that the user is approved to use the application 208. For example, assume that a wife and her husband both know the PIN to unlock the computing device 102 and launch the application 208 and thus both the wife and her husband can be authenticated to use the application 208. However, the wife can set different authorization levels for herself and her husband so that the wife has access to all functionality of the application 208 but that her husband has access to only a subset of the functionality of the application 208. E.g., the husband may have a dollar limit of $500 on mobile payments but the wife may have no dollar limit on mobile payments. Accordingly, the functionality usage authentication and authorization system 124 prevents the husband from making mobile payments that exceed $500 but allows the wife to make mobile payments of any amount (e.g., up to the amount of money in the wife's account).

Continuing with this example, further assume that the wife has a daughter who also knows the PIN to unlock the computing device 102 and launch the application 208 and thus can be authenticated to use the application 208. The wife may set a different authorization level for the daughter so that the daughter has a dollar limit of $75 on mobile payments. Accordingly, the functionality usage authentication and authorization system 124 prevents the husband from making mobile payments that exceed $500, prevents the daughter from making mobile payments that exceed $75, but allows the wife to make mobile payments of any amount (e.g., up to the amount of money in the wife's account).

Figure 5A:
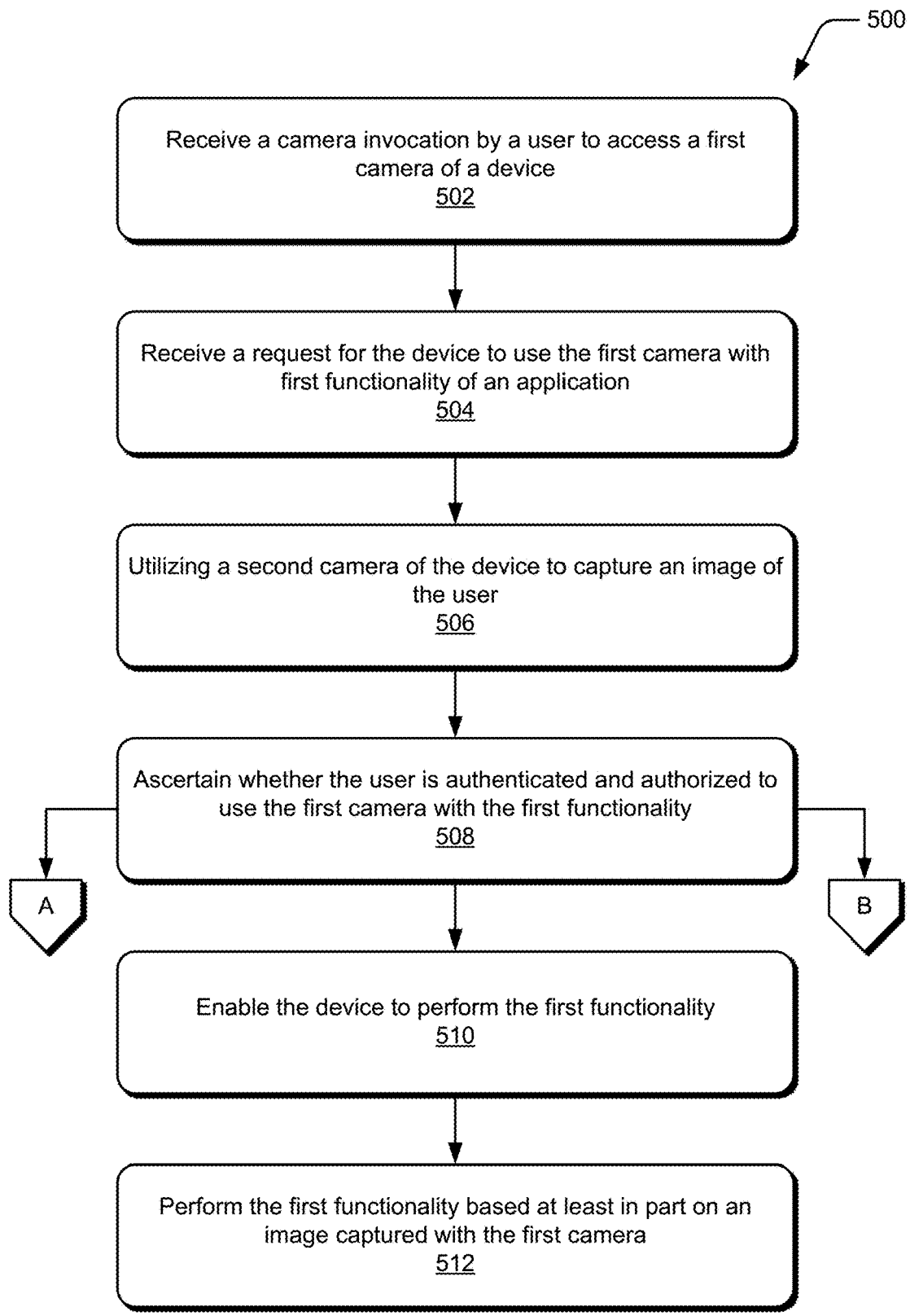
FIGS. 5A and 5B illustrate an example process for implementing the techniques discussed herein in accordance with one or more embodiments.
Figure 5B:
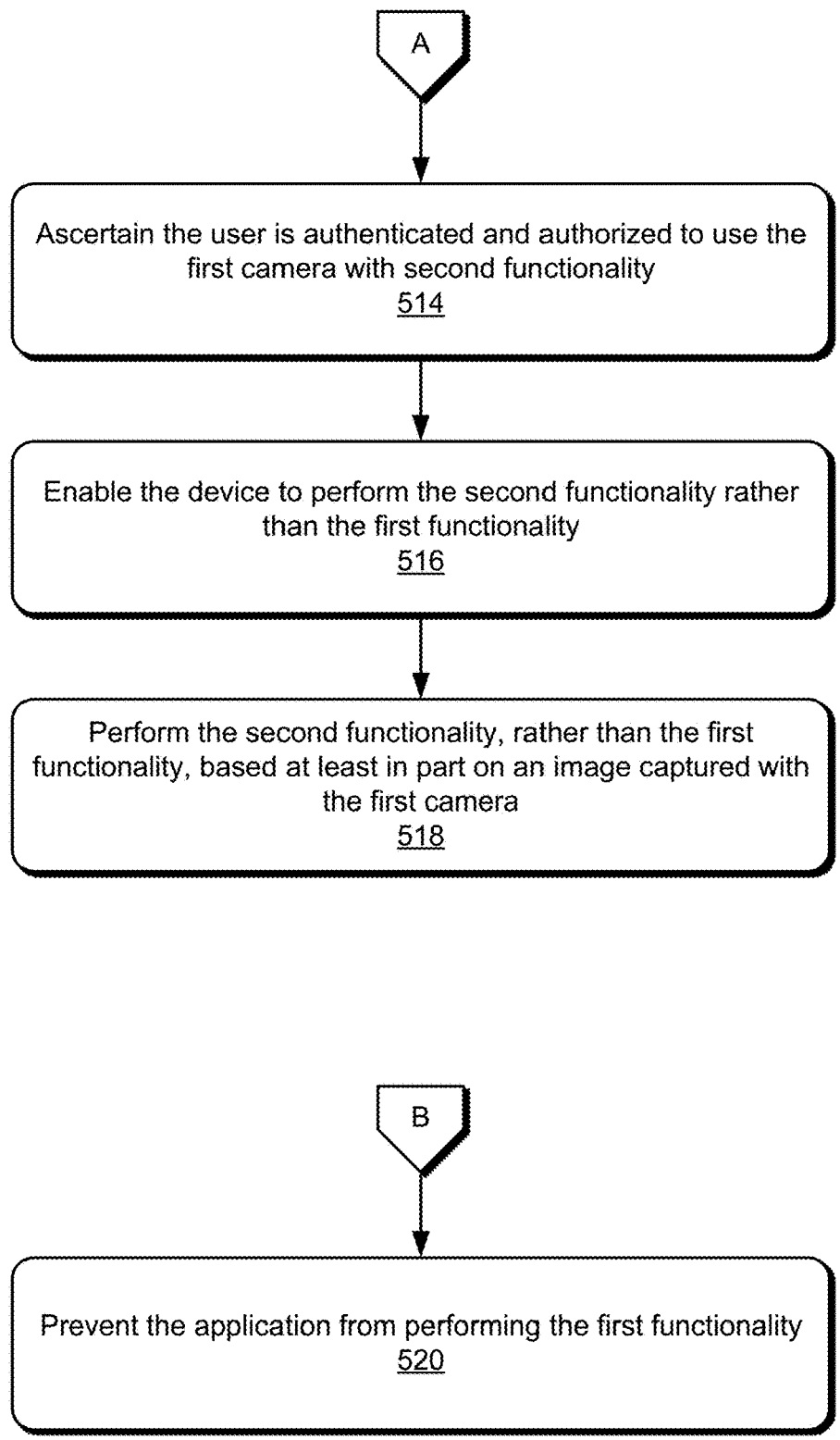

FIGS. 5A and 5B illustrate an example process 500 for implementing the techniques discussed herein in accordance with one or more embodiments. Process 500 is carried out by various components of a computing device, including a functionality usage authentication and authorization system such as the functionality usage authentication and authorization system 124 of FIG. 1 or FIG. 2, and can be implemented in software, firmware, hardware, or combinations thereof. Process 500 is shown as a set of acts and is not limited to the order shown for performing the operations of the various acts.

In process 500, a camera invocation by a user to access a first camera of a device (act 502). The first camera is, for example, a back facing camera of the device. This camera invocation can take various forms, such as a request to activate (e.g., power up or power on) a camera, a request to activate (e.g., launch, execute, resume execution of) an application that uses a camera, a request to capture an image using a camera, and so forth.

A request for the device to use the first camera with first functionality of an application is received (act 504). The request can be received in various manners, such as user selection of a menu item or user interface button, user input of an audio command, identification of a command embedded in a code (e.g., a QR code) in an image captured by a camera, a request to use a camera of the computing device 102, and so forth.

Responsive to the request in act 504, a second camera of the device is utilized to capture an image of the user (act 506). This second camera is, for example, a front facing camera of the device.

The device ascertains or determines whether the user is authenticated and authorized to use the first camera with the first functionality of the application (act 508). Whether the user is authenticated to use the application can be determined in various manners, such as by comparing the captured image of the user with an image or image model of users approved to use the application. Whether the user is authorized to use the first camera with the first functionality of the application can also be determined in various manners, such as by accessing authorization information associated with the approved user.

Responsive to ascertaining that the user is authenticated and authorized to use the first camera with the first functionality of the application, the device is enabled to perform the first functionality (act 510). This enabling can take various forms, such as notifying an application that the device is permitted to perform the first functionality.

The first functionality is performed based at least in part on an image captured with the first camera (act 512). This image can be a previously captured image (e.g., captured in act 504) or a newly captured image.

Returning to act 508, if the user is not authenticated and authorized to use the first camera with the first functionality of the application, then the device ascertains or determines whether the user is authenticated and authorized to use the first camera with second functionality of the application (act 514). This second functionality is a lesser functionality than the first functionality. Whether the user is authenticated to use the application can be determined in various manners, as discussed above. Whether the user is authorized to use the first camera with the second functionality of the application can also be determined in various manners, such as by accessing authorization information associated with the approved user.

Responsive to ascertaining that the user is authenticated and authorized to use the first camera with the second functionality of the application, the device is enabled to perform the second functionality (act 516). This enabling can take various forms, such as notifying an application that the device is permitted to perform the second functionality.

The second functionality is performed based at least in part on an image captured with the first camera (act 518). This image can be a previously captured image (e.g., captured in act 504) or a newly captured image. This performance of the second functionality is optionally conditioned on the user approving usage of the second functionality rather than the first functionality.

Returning to act 508, if the user is not authenticated to use the application or is not authorized to use the first camera with the first functionality or the second functionality of the application, then the device prevents the application from performing the requested first functionality (act 520). This prevention can take various forms, such as notifying an application that the device is not to perform the second functionality.

Figure 6:
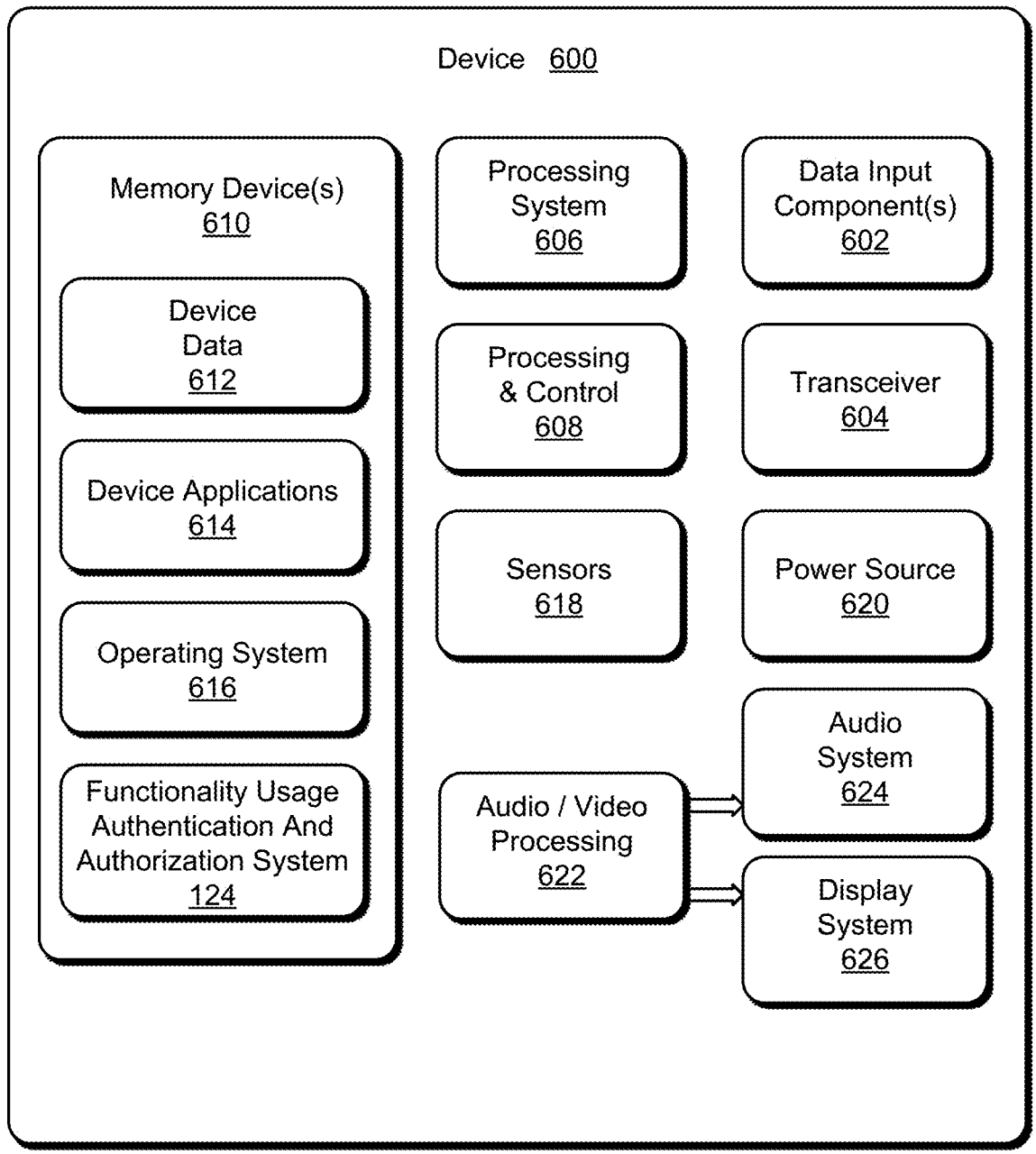
FIG. 6 illustrates various components of an example electronic device that can implement embodiments of the techniques discussed herein.

FIG. 6 illustrates various components of an example electronic device in which embodiments of application functionality authentication and authorization in a multi-camera system can be implemented. The electronic device 600 can be implemented as any of the devices described with reference to the previous FIG.s, such as any type of client device, mobile phone, tablet, computing, communication, entertainment, gaming, media playback, or other type of electronic device. In one or more embodiments the electronic device 600 includes the functionality usage authentication and authorization system 124, described above.

The electronic device 600 includes one or more data input components 602 via which any type of data, media content, or inputs can be received such as user-selectable inputs, messages, music, television content, recorded video content, and any other type of text, audio, video, or image data received from any content or data source. The data input components 602 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 602 may also include various other input components such as microphones, touch sensors, touchscreens, keyboards, and so forth.

The device 600 includes communication transceivers 604 that enable one or both of wired and wireless communication of device data with other devices. The device data can include any type of text, audio, video, image data, or combinations thereof. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, wired local area network (LAN) Ethernet transceivers for network data communication, and cellular networks (e.g., third generation networks, fourth generation networks such as LTE networks, or fifth generation networks).

The device 600 includes a processing system 606 of one or more processors (e.g., any of microprocessors, controllers, and the like) or a processor and memory system implemented as a system-on-chip (SoC) that processes computer-executable instructions. The processing system 606 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon or other hardware.

Alternately or in addition, the device can be implemented with any one or combination of software, hardware, firmware, or fixed logic circuitry that is implemented in connection with processing and control circuits, which are generally identified at 608. The device 600 may further include any type of a system bus or other data and command transfer system that couples the various components within the device. A system bus can include any one or combination of different bus structures and architectures, as well as control and data lines.

The device 600 also includes computer-readable storage memory devices 610 that enable data storage, such as data storage devices that can be accessed by a computing device, and that provide persistent storage of data and executable instructions (e.g., software applications, programs, functions, and the like). Examples of the computer-readable storage memory devices 610 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 600 may also include a mass storage media device.

The computer-readable storage memory device 610 provides data storage mechanisms to store the device data 612, other types of information or data, and various device applications 614 (e.g., software applications). For example, an operating system 616 can be maintained as software instructions with a memory device and executed by the processing system 606. The device applications 614 may also include a device manager, such as any form of a control application, software application, signal-processing and control module, code that is native to a particular device, a hardware abstraction layer for a particular device, and so on.

The device 600 can also include one or more device sensors 618, such as any one or more of an ambient light sensor, a proximity sensor, a touch sensor, an infrared (IR) sensor, accelerometer, gyroscope, thermal sensor, audio sensor (e.g., microphone), and the like. The device 600 can also include one or more power sources 620, such as when the device 600 is implemented as a mobile device. The power sources 620 may include a charging or power system, and can be implemented as a flexible strip battery, a rechargeable battery, a charged super-capacitor, or any other type of active or passive power source.

The device 600 additionally includes an audio or video processing system 622 that generates one or both of audio data for an audio system 624 and display data for a display system 626. In accordance with some embodiments, the audio/video processing system 622 is configured to receive call audio data from the transceiver 604 and communicate the call audio data to the audio system 624 for playback at the device 600. The audio system or the display system may include any devices that process, display, or otherwise render audio, video, display, or image data. Display data and audio signals can be communicated to an audio component or to a display component, respectively, via an RF (radio frequency) link, S-video link, HDMI (high-definition multimedia interface), composite video link, component video link, DVI (digital video interface), analog audio connection, or other similar communication link. In implementations, the audio system or the display system are integrated components of the example device. Alternatively, the audio system or the display system are external, peripheral components to the example device.

Although embodiments of techniques for application functionality authentication and authorization in a multi-camera system have been described in language specific to features or methods, the subject of the appended claims is not necessarily limited to the specific features or methods described. Rather, the specific features and methods are disclosed as example implementations of techniques for implementing application functionality authentication and authorization in a multi-camera system. Further, various different embodiments are described, and it is to be appreciated that each described embodiment can be implemented independently or in connection with one or more other described embodiments. Additional aspects of the techniques, features, and/or methods discussed herein relate to one or more of the following:

A method comprising: receiving a camera invocation by a user to access a first camera of a wireless device; receiving a request for the wireless device to use the first camera with first functionality of an application; responsive to the request, utilizing a second camera of the wireless device to capture an image of the user and ascertain, based on the captured image, whether the user is authenticated and authorized to use the first camera with the first functionality of the application; and responsive to ascertaining that the user is authenticated and authorized to use the first camera with the first functionality of the application: enabling the wireless device to perform the first functionality, and performing the first functionality based at least in part on an image captured with the first camera.

Alternatively or in addition to the above described method, any one or combination of the following. The method further comprising responsive to ascertaining that the user is not authenticated or not authorized to use the first camera with the first functionality, preventing the application from performing the first functionality. The method further comprising responsive to ascertaining that the user is not authenticated or not authorized to use the first camera with the first functionality, communicating a notification of a failed access attempt by the user, the notification including the captured image of the user. The receiving the camera invocation comprising receiving a user request to activate the application. The method further comprising maintaining a record of performance of the first functionality by the user, the record including the image of the user captured with the second camera. Wherein the first camera is a rear facing camera and the second camera is a front facing camera with a depth sensor. Wherein receiving the request comprises detecting initiation of a transaction for a particular value. Wherein detecting initiation of the transaction comprises scanning a code with the first camera. Wherein detecting initiation of the transaction comprises opening an application identified on a list of applications approved for performing the first functionality. The method further comprising: ascertaining, based on the captured image of the user, whether the user is authenticated and authorized to use the first camera with second functionality of the application; and responsive to ascertaining that the user is authenticated and authorized to use the first camera with the second functionality of the application but not the first functionality, enabling the wireless device to perform the second functionality and performing the second functionality, rather than the first functionality, based at least in part on the image captured with the first camera. The method further comprising: maintaining a record of the first functionality and the captured image of the user; and displaying, in a functionality usage report, an indication of the performance of the first functionality and the captured image.

A computing device comprising: a processor implemented in hardware; a first camera; a second camera; and a computer-readable storage medium having stored thereon multiple instructions that, responsive to execution by the processor, cause the processor to perform acts including: receiving a request for the computing device to use the first camera with first functionality of an application running on the computing device; responsive to the request, utilizing the second camera to capture an image of the user and ascertain, based on the captured image, whether the user is authenticated and authorized to use the first camera with the first functionality of the application; and responsive to ascertaining that the user is authenticated and authorized to use the first camera with the first functionality of the application: enabling the wireless device to perform the first functionality, and performing the first functionality based at least in part on an image captured with the first camera.

Alternatively or in addition to the above described computing device, any one or combination of the following. The acts further including responsive to ascertaining that the user is not authenticated or not authorized to use the first camera with the first functionality, preventing the application from performing the first functionality. The acts further including responsive to ascertaining that the user is not authenticated or not authorized to use the first camera with the first functionality, communicating a notification of a failed access attempt by the user, the notification including the captured image of the user. The acts further including: ascertaining, based on the captured image of the user, whether the user is authenticated and authorized to use the first camera with second functionality of the application; and responsive to ascertaining that the user is authenticated and authorized to use the first camera with the second functionality of the application but not the first functionality, enabling the wireless device to perform the second functionality and performing the second functionality, rather than the first functionality, based at least in part on the image captured with the first camera. Wherein the first camera comprises a rear facing camera and the second camera comprises a front facing camera with a depth sensor.

A system in a wireless device, the system comprising: a first camera; a second camera; an application, implemented at least in part in hardware, configured to receive a request for the wireless device to use the first camera with first functionality of the application; a functionality usage authentication and authorization system, implemented at least in part in hardware, configured to use, in response to the request, the second camera to capture an image of the user and ascertain and indicate to the application, based on the captured image, whether the user is authenticated and authorized to use the first camera with the first functionality of the application; and the application being further configured to, in response to the functionality usage authentication and authorization system indicating that the user is authenticated and authorized to use the first camera with the first functionality of the application, enable the wireless device to perform the first functionality, and perform the first functionality based at least in part on an image captured with the first camera.

Alternatively or in addition to the above described system, any one or combination of the following. The application being further configured to, in response to the functionality usage authentication and authorization system indicating that the user is not authenticated or not authorized to use the first camera with the first functionality, preventing the application from performing the first functionality. The application being further configured to, in response to the functionality usage authentication and authorization system indicating that the user is not authenticated or not authorized to use the first camera with the first functionality, communicate a notification of a failed access attempt by the user, the notification including the captured image of the user. The system further comprising: the functionality usage authentication and authorization system being further configured to ascertain and indicate to the application, based on the image captured with the second camera, whether the user is authenticated and authorized to use the first camera with second functionality of the application; and the application being further configured to, in response to the functionality usage authentication and authorization system indicating that the user is authenticated and authorized to use the first camera with the second functionality of the application but not the first functionality, enable the wireless device to perform the second functionality and perform the second functionality, rather than the first functionality, based at least in part on the image captured with the first camera. Wherein the first camera is a rear facing camera and the second camera is a front facing camera with a depth sensor.

What is claimed is:

1. A method comprising:
receiving a request for a wireless device to use a first camera of a wireless device to initiate a transfer of funds of a particular value via a financial application;
responsive to the request, utilizing a second camera of the wireless device to capture a first image of a user and ascertain, based on the first image, whether the user is authenticated and authorized to use the first camera to initiate the transfer of funds of the particular value via the financial application;
responsive to ascertaining that the user is not authenticated or not authorized to use the first camera to initiate the transfer of funds of the particular value via the financial application, ascertaining, based on the first image, whether the user is authorized to use the first camera to initiate a transfer of funds of a lesser value via the financial application; and
responsive to ascertaining that the user is authorized to use the first camera to initiate the transfer of funds of the lesser value via the financial application, performing the transfer of funds of the lesser value via the financial application using a second image captured with the first camera.

2. The method of claim 1, further comprising responsive to ascertaining that the user is not authenticated or not authorized to use the first camera to initiate the transfer of funds of the lesser value, preventing the financial application from performing the transfer of funds.

3. The method of claim 2, further comprising responsive to ascertaining that the user is not authenticated or not authorized to use the first camera to initiate the transfer of funds of the lesser value, communicating a notification of a failed access attempt by the user, the notification including the first image of the user.

4. The method of claim 1, further comprising maintaining a record of the request, the record including the first image of the user captured with the second camera.

5. The method of claim 1, wherein the first camera is a rear facing camera and the second camera is a front facing camera with a depth sensor.

6. The method of claim 1, wherein the receiving the request includes receiving an image captured by the first camera, the image including a payment code scanned to initiate the transfer of funds of the particular value via the financial application.

7. The method of claim 1, further comprising performing the ascertaining whether the user is authenticated and authorized to use the first camera to initiate the transfer of funds of the particular value and of the lesser value responsive to the financial application being identified on a list of applications approved for performing the transfer of funds.

8. A computing device comprising:
a processor implemented in hardware;
a first camera;
a second camera; and
a computer-readable storage medium having stored thereon multiple instructions that, responsive to execution by the processor, cause the processor to perform acts including:
receiving a request for the computing device to use the first camera to initiate a transfer of funds of a particular value via a financial application running on the computing device;
responsive to the request, utilizing the second camera to capture a first image of a user and ascertain, based on the first image, whether the user is authenticated and authorized to use the first camera to initiate the transfer of funds of the particular value;
responsive to ascertaining that the user is not authenticated or not authorized to use the first camera to initiate the transfer of funds of the particular value via the financial application, ascertaining, based on the first image, whether the user is authorized to use the first camera to initiate a transfer of funds of a lesser value via the financial application; and
responsive to ascertaining that the user is authorized to use the first camera to initiate the transfer of funds of the lesser value via the financial application, performing the transfer of funds of the lesser value via the financial application using a second image captured with the first camera.

9. The computing device of claim 8, the acts further including responsive to ascertaining that the user is not authenticated or not authorized to use the first camera to initiate the transfer of funds of the lesser value, preventing the financial application from performing the transfer of funds.

10. The computing device of claim 9, the acts further including responsive to ascertaining that the user is not authenticated or not authorized to use the first camera to initiate the transfer of funds of the lesser value, communicating a notification of a failed access attempt by the user, the notification including the first image of the user.

11. A system in a wireless device, the system comprising:
a first camera;
a second camera;
a financial application, implemented at least in part in hardware, configured to receive a request for the wireless device to use the first camera to initiate a transfer of funds of a particular value via the financial application;
a functionality usage authentication and authorization system, implemented at least in part in hardware, configured to use, in response to the request, the second camera to capture a first image of a user and ascertain and indicate to the financial application, based on the first image, that the user is not authenticated or not authorized to use the first camera to initiate the transfer of funds of the particular value via the financial application, but the user is authorized to use the first camera to initiate the transfer of funds of a lesser value via the financial application; and
the financial application being further configured to, in response to the functionality usage authentication and authorization system indicating that the user is authenticated and authorized to use the first camera to initiate the transfer of funds of the lesser value, performing the transfer of funds of the lesser value via the financial application using a second image captured with the first camera.

12. The system of claim 11, the financial application being further configured to, in response to the functionality usage authentication and authorization system indicating that the user is not authenticated or not authorized to use the first camera to initiate the transfer of funds of the lesser value, preventing the financial application from performing the transfer of funds.

13. The system of claim 12, the financial application being further configured to, in response to the functionality usage authentication and authorization system indicating that the user is not authenticated or not authorized to use the first camera to initiate the transfer of funds of the lesser value, communicate a notification of a failed access attempt by the user, the notification including the first image of the user.

14. The method of claim 4, wherein the record further includes an indication of the requested transfer of funds of the particular value, and an indication of the performed transfer of funds of the lesser value.

15. The method of claim 14, further comprising displaying, in a functionality usage report, the indication of the requested transfer of funds of the particular value, the indication of the performed transfer of funds of the lesser value, and the first image of the user.

16. The method of claim 6, wherein the image including the payment code is the second image used to perform the transfer of funds of the lesser value via the financial application.

17. The method of claim 1, further comprising responsive to ascertaining that the user is authenticated and authorized to use the first camera to initiate the transfer of funds of the particular value via the financial application, performing the transfer of funds of the particular value via the financial application using the second image captured with the first camera.

18. The computing device of claim 8, the acts further including responsive to ascertaining that the user is authenticated and authorized to use the first camera to initiate the transfer of funds of the particular value via the financial application, performing the transfer of funds of the particular value via the financial application using the second image captured with the first camera.

19. The computing device of claim 8, the acts further including:
   maintaining a record of the request, the record including an indication of the requested transfer of funds of the particular value, an indication of the performed transfer of funds of the lesser value, and the first image of the user; and
   displaying, in a functionality usage report, the indication of the requested transfer of funds of the particular value, the indication of the performed transfer of funds of the lesser value, and the first image of the user.

20. The computing device of claim 8, wherein:
   the receiving the request includes receiving an image captured by the first camera, the image including a payment code scanned to initiate the transfer of funds of the particular value via the financial application; and
   the performing the transfer of funds includes performing the transfer of funds of the lesser value via the financial application using the payment code included in the image.

* * * * *